(12) United States Patent
Rummel (10) Patent No.: US 9,845,839 B2
(45) Date of Patent: Dec. 19, 2017

(54) SHOCK ABSORBER HAVING CHECK DISC FOR ORIFICE PASSAGE

(71) Applicant: Tenneco Automotive Operating Company Inc., Lake Forest, IL (US)

(72) Inventor: Chad Rummel, Grass Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 15/046,566

(22) Filed: Feb. 18, 2016

(65) Prior Publication Data

US 2017/0241502 A1 Aug. 24, 2017

(51) Int. Cl.
*F16F 9/348* (2006.01)
*F16F 9/18* (2006.01)
*B60G 13/08* (2006.01)

(52) U.S. Cl.
CPC ............ *F16F 9/3484* (2013.01); *B60G 13/08* (2013.01); *F16F 9/18* (2013.01); *F16F 9/348* (2013.01); *B60G 2206/41* (2013.01); *F16F 9/185* (2013.01); *F16F 9/3487* (2013.01)

(58) Field of Classification Search
CPC .... F16F 9/18; F16F 9/185; F16F 9/348; F16F 9/3484; F16F 9/3487; B60G 13/08
USPC .......................... 188/282.5, 313, 317, 322.15
See application file for complete search history.

(56) References Cited

U.S. PATENT DOCUMENTS

| | | |
|---|---|---|
| 3,837,445 A | 9/1974 | Pierle |
| 3,927,871 A | 12/1975 | de Baan |
| 4,183,509 A | 1/1980 | Nishikawa et al. |
| 4,512,447 A | 4/1985 | Miura |
| 4,724,937 A | 2/1988 | Fannin et al. |
| 4,830,152 A | 5/1989 | Rauert et al. |
| 4,964,493 A | 10/1990 | Yamaura et al. |
| 5,129,488 A * | 7/1992 | Furuya ................... B60G 17/08 188/282.6 |
| 5,148,897 A | 9/1992 | Vanroye |
| 5,261,448 A | 11/1993 | Furuya et al. |
| 5,409,087 A | 4/1995 | Angermann et al. |
| 5,529,154 A * | 6/1996 | Tanaka .................. F16F 9/3484 188/280 |
| 5,690,195 A * | 11/1997 | Kruckemeyer ....... F16F 9/3485 188/280 |
| 5,810,127 A | 9/1998 | Schmidt |

(Continued)

FOREIGN PATENT DOCUMENTS

WO WO-2013110728 A1 8/2013

*Primary Examiner* — Thomas Irvin
(74) *Attorney, Agent, or Firm* — Harness, Dickey & Pierce, P.L.C.

(57) ABSTRACT

A shock absorber for a vehicle includes a pressure tube that defines a fluid chamber and a piston disposed within the fluid chamber. The piston divides the fluid chamber into an upper working chamber and a lower working chamber, and defines a compression passage and a rebound passage. A valve disc assembly of the shock absorber engages the piston and controls the flow of fluid between the upper and lower working chambers. The valve disc assembly includes a check disc and an orifice disc. The check disc is disposed between the piston and the orifice disc. The orifice disc defines an orifice, and the check disc prohibits the flow of fluid through the orifice as the fluid flows in a first direction and permits the flow of fluid through the orifice as the fluid flows in a second direction opposite of the first direction.

16 Claims, 5 Drawing Sheets

(56) References Cited

U.S. PATENT DOCUMENTS

| | | | |
|---|---|---|---|
| 6,089,142 A | 7/2000 | Adrian et al. | |
| 6,202,805 B1 * | 3/2001 | Okada | F16F 9/3214 188/266.2 |
| 6,230,858 B1 | 5/2001 | Moradmand et al. | |
| 6,371,262 B1 * | 4/2002 | Katou | F16F 9/465 188/266.5 |
| 6,382,372 B1 | 5/2002 | Keil et al. | |
| 6,533,085 B2 | 3/2003 | Moradmand et al. | |
| 6,561,326 B2 | 5/2003 | Gotz | |
| 6,634,379 B2 * | 10/2003 | Asadi | F16F 9/3214 137/512.1 |
| 6,655,512 B2 | 12/2003 | Moradmand et al. | |
| 6,668,986 B2 * | 12/2003 | Moradmand | F16F 9/466 188/266.2 |
| 6,672,436 B1 | 1/2004 | Keil et al. | |
| 6,899,207 B2 | 5/2005 | Deferme et al. | |
| 6,981,578 B2 | 1/2006 | Leiphart et al. | |
| 7,040,468 B2 | 5/2006 | Shinata | |
| 7,070,029 B2 | 7/2006 | Deferme | |
| 7,322,449 B2 * | 1/2008 | Yamaguchi | F16F 9/348 188/282.3 |
| 7,407,044 B2 | 8/2008 | Jee | |
| 7,458,448 B2 * | 12/2008 | Katou | F16F 9/3485 188/282.6 |
| 7,694,785 B2 * | 4/2010 | Nakadate | F16F 9/464 188/266.5 |
| 7,694,786 B2 * | 4/2010 | Asadi | F16F 9/3484 188/282.6 |
| 7,703,586 B2 | 4/2010 | Deferme | |
| 7,766,137 B2 | 8/2010 | De Kock | |
| 8,651,252 B2 * | 2/2014 | Katayama | F16F 9/3484 188/282.6 |
| 8,794,407 B2 | 8/2014 | Vanbrabant et al. | |
| 8,800,729 B2 * | 8/2014 | Yabe | F16F 9/465 188/266.6 |
| 9,067,471 B2 * | 6/2015 | Tuts | B60G 13/08 |
| 9,410,595 B2 * | 8/2016 | Yamada | F16F 9/3481 |
| 9,441,699 B2 * | 9/2016 | Lawler | F16F 9/3484 |
| 9,500,251 B2 * | 11/2016 | Rummel | F16F 9/3484 |
| 2002/0063023 A1 | 5/2002 | Moradmand et al. | |
| 2009/0000891 A1 | 1/2009 | Kouyama et al. | |
| 2009/0260938 A1 | 10/2009 | Hikosaka | |
| 2014/0262655 A1 | 9/2014 | Tuts et al. | |
| 2014/0332332 A1 | 11/2014 | Lawler et al. | |
| 2015/0337918 A1 * | 11/2015 | Rummel | F16F 9/3482 188/315 |

* cited by examiner

SHOCK ABSORBER HAVING CHECK DISC FOR ORIFICE PASSAGE

FIELD

The present disclosure relates to shock absorbers. More particularly, the present disclosure relates to a valve disc assembly for controlling damping characteristics of a shock absorber during low hydraulic fluid flow.

BACKGROUND

This section provides background information related to the present disclosure, which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of tile vehicle. The piston is connected to the sprung portion of the automobile through a piston rod which extends through the pressure tube.

The piston divides the pressure tube into an upper working chamber and a lower working chamber, both of which are filled with hydraulic fluid. Because the piston is able, through valving, to limit the flow of the hydraulic fluid between the upper and lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to control the flow of fluid between the lower working chamber and the reserve chamber.

For a full-displacement valving system, all rebound damping forces produced by the shock absorber are the result of piston valving, while compression forces are a combination of piston and cylinder-end valving. The greater the degree to which the flow of fluid within the shock absorber is restricted by the piston and/or cylinder end, the greater the damping forces which are generated by the shock absorber. Thus, a highly restricted flow of fluid would produce a firm ride while a less restricted flow of fluid would produce a soft ride.

Shock absorbers have been developed to provide different damping characteristics depending on the speed or acceleration of the piston within the pressure tube. Because of the exponential relationship between pressure drop and flow rate for a fixed orifice, it is a difficult task to obtain a damping force at relatively low piston velocities (i.e., low hydraulic fluid speed), particularly at velocities near zero. Low speed damping force is important to vehicle handling, since most vehicle handling events are controlled by low speed vehicle body velocities.

Various systems for tuning shock absorbers during low speed movement of the piston include a fixed low speed orifice or orifices which provide a defined leak path which is open across the piston for both compression and rebound. While a soft ride is generally preferred during compression, a firm ride is generally preferred during rebound.

SUMMARY

This section provides a general summary of the disclosure, and is not a comprehensive disclosure of its full scope or all of its features. The present disclosure relates to a shock absorber for a vehicle. The shock absorber may include a pressure tube, a piston, and a valve disc assembly. The pressure tube defines a fluid chamber and the piston divides the fluid chamber into an upper working chamber and a lower working chamber. The piston defines a compression passage and a rebound passage that extend through the piston between the upper working chamber and the lower working chamber.

The valve disc assembly engages the piston and controls a flow of fluid between the upper working chamber and the lower working chamber. The valve disc assembly includes a check disc positioned within a land of the piston and an orifice disc positioned at the land of the piston. The check disc is positioned between the piston and the orifice disc. The orifice disc defines an orifice, and the check disc may control the flow of fluid through the orifice to allow fluid to flow through the orifice in a first direction and prohibit fluid to flow through the orifice in a second direction opposite to the first direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
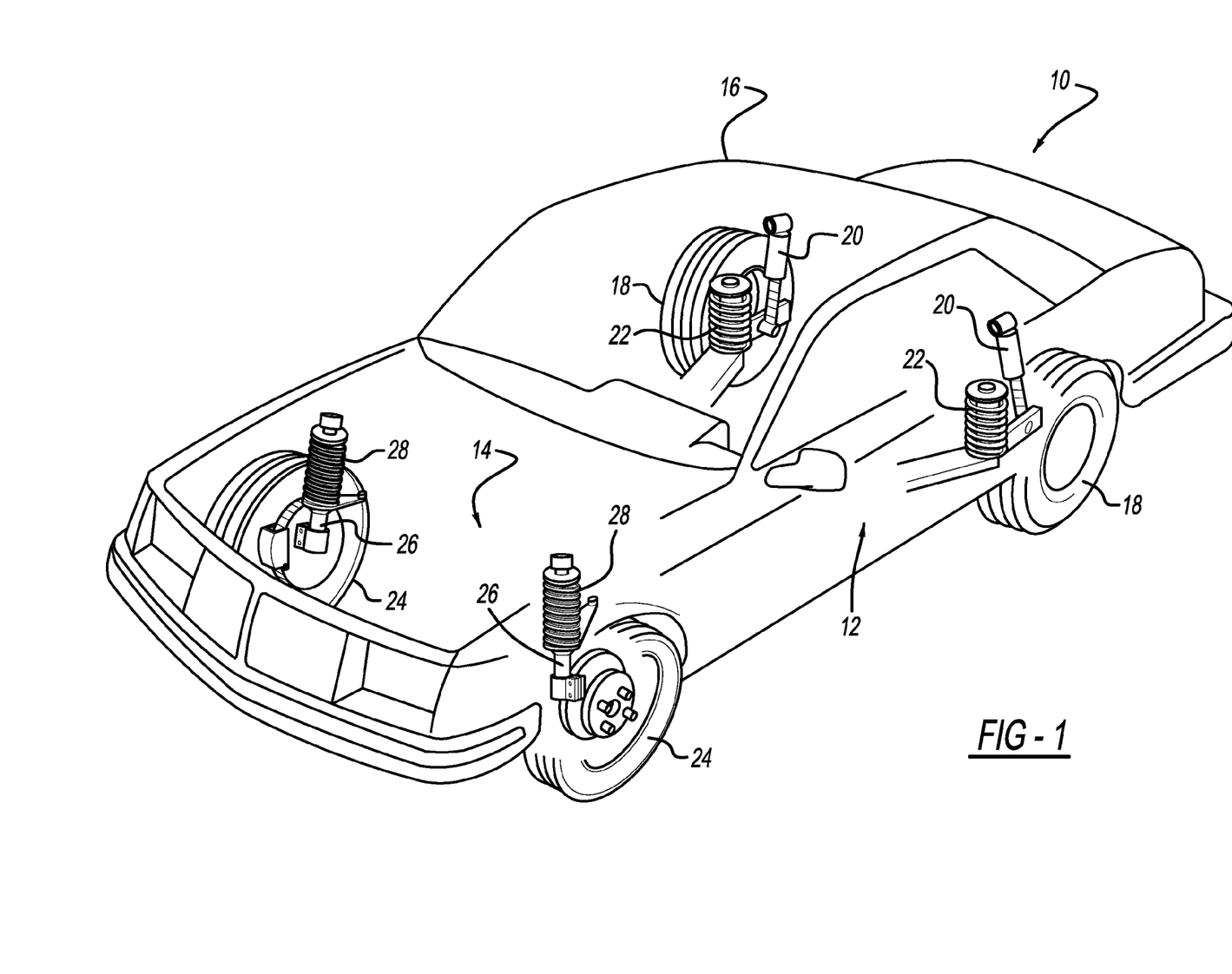
FIG. 1 is a schematic representation of a typical automobile which incorporates at least one shock absorber.

The present disclosure will now be described more fully with reference to the accompany drawings. FIG. 1 illustrates a vehicle 10 incorporating a suspension system with shock absorbers having a check disc for controlling fluid flow through an orifice passage in accordance with the present disclosure. The vehicle 10 includes a rear suspension 12, a front suspension 14, and a body 16. The rear suspension 12 has a transversely extending rear axle assembly (not shown) adapted to operatively support the vehicle's rear wheels 18. The rear axle assembly is operatively connected to the body 16 by means of a pair of shock absorbers 20 and a pair of helical coil springs 22. Similarly, the front suspension 14 includes a transversely extending front axle assembly (not shown) to operatively support the vehicle's front wheels 24. The front axle assembly is operatively connected to the body 16 by means of a second pair of shock absorbers 26 and by a pair of helical coil springs 28.

Shock absorbers 20 and 26 serve to dampen the relative motion of the unsprung portion (i.e., front and rear suspensions 12 and 14, respectively) and the sprung portion (i.e., the body 16) of the vehicle 10. While the vehicle 10 is depicted as a passenger car having front and rear axle assemblies, the shock absorbers 20 and 26 may be used with other types of vehicles or in other types of applications including, but not limited to, vehicles incorporating independent front and/or independent rear suspension systems.

Figure 2:
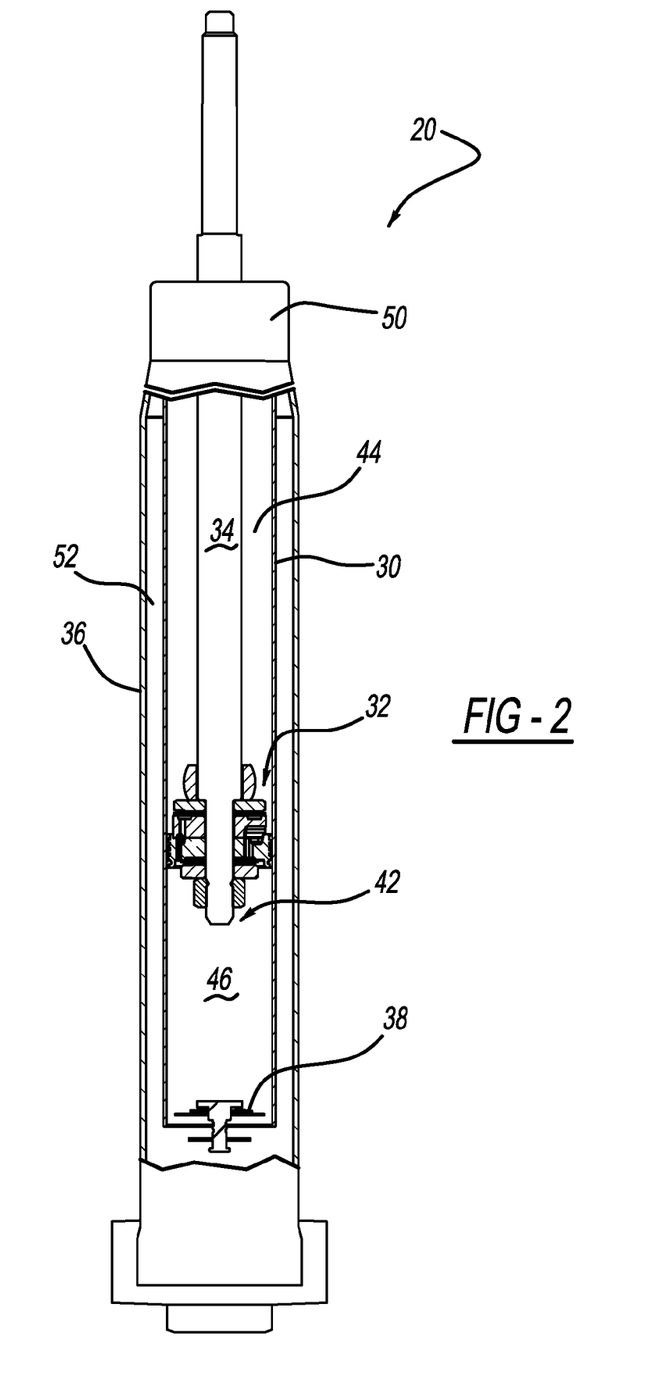
FIG. 2 is a side partial cross-sectional view of a shock absorber.

Referring now to FIG. 2, the shock absorber 20 is shown in greater detail. While FIG. 2 illustrates only the shock absorber 20, it is to be understood that the shock absorber 26 includes the same components as the shock absorber 20. The shock absorber 26 only differs from the shock absorber 20 in the manner in which it is adapted to be connected to the sprung and unsprung masses of vehicle 10. Furthermore, while the shock absorber 20 is depicted as a dual-tube shock absorber, the shock absorber 20 may also be a mono-tube shock absorber.

Figure 3:
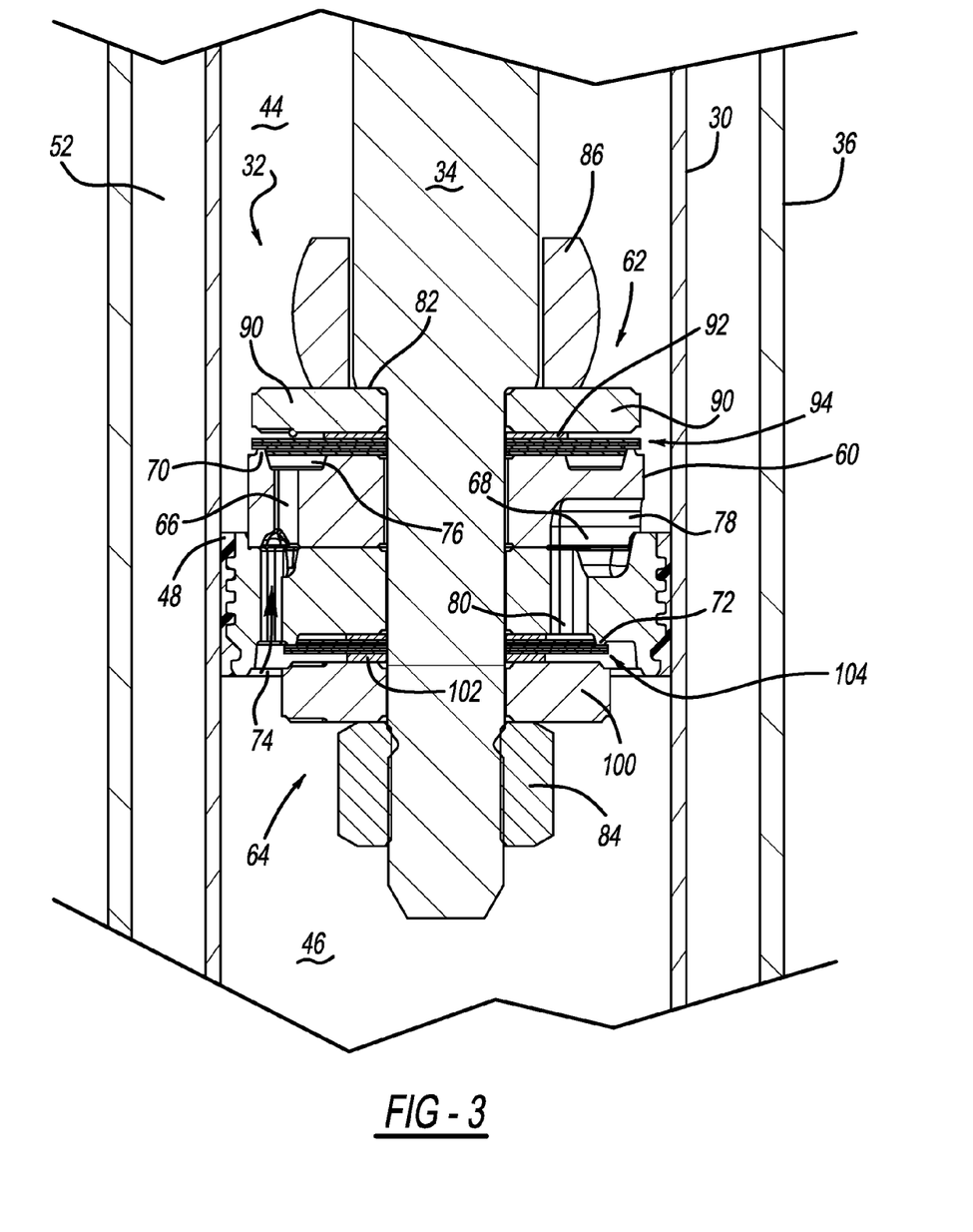
FIG. 3 is an enlarged cross-sectional view of a piston assembly of the shock absorber.

The shock absorber 20 comprises a pressure tube 30, a piston assembly 32, a piston rod 34, a reservoir tube 36, and a base valve assembly 38. The pressure tube 30 defines a working chamber 42. The piston assembly 32 is slidably disposed within the pressure tube 30 and divides the working chamber 42 into an upper working chamber 44 and a lower working chamber 46. A seal 48, which is shown in FIG. 3, is disposed between the piston assembly 32 and the pressure tube 30 to permit sliding movement of the piston assembly 32 with respect to the pressure tube 30 without generating undue frictional forces as well as sealing the upper working chamber 44 from the lower working chamber 46.

The piston rod 34 is attached to the piston assembly 32 and extends through the upper working chamber 44 and through an upper end cap 50 which closes the upper end of the pressure tube 30. The end of the piston rod 34 opposite to the piston assembly 32 is adapted to be secured to the sprung portion of vehicle 10.

Valving within the piston assembly 32 controls the movement of fluid between the upper working chamber 44 and the lower working chamber 46 during movement of the piston assembly 32 within the pressure tube 30. Because the piston rod 34 extends only through the upper working chamber 44 and not the lower working chamber 46, movement of the piston assembly 32 with respect to the pressure tube 30 causes a difference in the amount of fluid displaced in the upper working chamber 44 and the amount of fluid displaced in the lower working chamber 46. The difference in the amount of fluid displaced flows through the base valve assembly 38, the piston assembly 32, or a combination thereof.

The reservoir tube 36 surrounds the pressure tube 30 to define a fluid reservoir chamber 52 located between tubes 30 and 36. The base valve assembly 38 is disposed between the lower working chamber 46 and the reservoir chamber 52 to control the flow of fluid between the chambers 46 and 52. When the shock absorber 20 extends in length, fluid flows from the reservoir chamber 52 to the lower working chamber 46 through the base valve assembly 38. Fluid may also flow from the upper working chamber 44 to the lower working chamber 46 through the piston assembly 98. When the shock absorber 20 compresses in length, an excess of fluid must be removed from the lower working chamber 46. Thus, fluid flows from the lower working chamber 46 to the reservoir chamber 52 through the base valve assembly 38. Furthermore, fluid also flows from the lower working chamber 46 to the upper working chamber 44 through the piston assembly 98.

Referring now to FIG. 3, the piston assembly 32 comprises a piston body 60, a compression valve assembly 62, and a rebound valve assembly 64. The piston body 60 defines a plurality of compression fluid passages 66 and a plurality of rebound fluid passages 68, and includes a compression valve land 70 and a rebound valve land 72. The compression fluid passages 66 include an inlet 74 and an outlet 76. The rebound fluid passages 68 include an inlet 78 and an outlet 80. The compression fluid passages 66 and the rebound fluid passages 68 fluidly couple the upper working chamber 44 and the lower working chamber 46.

The piston body 60 abuts with the compression valve assembly 62 which abuts with a shoulder 82 formed on the piston rod 34. The piston body 60 also abuts with the rebound valve assembly 64 which is retained by a retaining nut 84. The retaining nut 84 secures the piston body 60 and the valve assemblies 62 and 64 to the piston rod 34.

The compression valve assembly 62 includes a retainer 90, one or more spacers 92, and a valve disc assembly 94. The retainer 90 is disposed above the piston body 60 and abuts with the shoulder 82. The spacers 92 may be disposed between the valve disc assembly 94 and the retainer 90. The valve disc assembly 94 abuts with the compression valve land 70 and closes the outlet 76 of the compression fluid passages 66.

The rebound valve assembly 64 includes a retainer 100, one or more spacers 102, and a valve disc assembly 104. The retainer 100 is disposed below the piston body 60 and abuts with the retaining nut 84. The spacers 102 may be disposed between the valve disc assembly 104 and the retaining nut 84 and between the valve disc assembly 104 and the piston body 60. The valve disc assembly 104 abuts with the rebound valve land 72 and closes the outlet 80 of the rebound fluid passages 68.

The damping characteristics for both rebound (extension) and compression for the shock absorber 20 are determined by the piston assembly 32. More particularly, the piston assembly 32 is provided as a full-flow piston assembly, which includes valving for mid/high fluid speeds and an independent valving for low piston speeds (i.e., low hydraulic fluid flow or low fluid speed). During mid/high level speed, damping is controlled by the deflection of the valve disc assembly 94 of the compression valve assembly 62 and the valve disc assembly 104 of the rebound valve assembly 64. During low level speeds, damping is controlled by bleed passages. In the following, the valve disc assembly 94 for the compression valve assembly 62 is referred to as the compression valve disc assembly 94 and the valve disc assembly 104 for the rebound valve assembly 64 is referred to as the rebound valve disc assembly 104.

Fluid flowing through the compression fluid passages 66 is controlled by the compression valve assembly 62. During a compression stroke, fluid in the lower working chamber 46 increases in pressure while the fluid in the upper working chamber 44 decreases in pressure, thus, causing fluid to flow from the lower working chamber 46 to the compression fluid passages 66. The fluid pressure within the compression fluid passage 66 eventually opens the compression valve assembly 62 by deflecting the compression valve disc assembly 94. Thus, fluid flows through the compression fluid passages 66 into the upper working chamber 44. Prior to the deflection of the compression valve disc assembly 94, a controlled amount of fluid flows from the lower working chamber 46 to the upper working chamber 44 through a fixed orifice bleed passage which provides damping at low fluid speeds, as described herein.

Fluid flowing through the rebound fluid passages 68 is controlled by the rebound valve assembly 64. During the compression stroke, the rebound valve assembly 64 restricts the flow of fluid through the rebound fluid passages 68. Fluid in the lower working chamber 46 exerts a force onto the rebound valve assembly 64. The rebound valve assembly 64 seals against the rebound valve land 72 of the piston body 60, thereby preventing fluid from entering the rebound fluid passages 68 from the lower working chamber 46 at mid/high fluid speed.

During a rebound stroke, fluid in the upper working chamber 44 is pressurized, and fluid flows from the upper working chamber 44 to the rebound fluid passages 68. The fluid pressure within the rebound fluid passages 68 eventually opens the rebound valve assembly 64 by deflecting the rebound valve disc assembly 104. Thus, fluid flows through the rebound fluid passages 68 into the lower working chamber 46.

The compression valve assembly 62 restricts the flow of fluid through the compression fluid passages 66 during the rebound stroke. Specifically, fluid in the upper working chamber 44 exerts a force onto the compression valve assembly 62. The compression valve assembly 62 seals against the compression valve land 70 of the piston body 60, thereby preventing fluid from flowing through the compression fluid passages 66. Prior to the deflection of the rebound valve disc assembly 104, a controlled amount of fluid flows between the lower working chamber 46 and the upper working chamber 44 through a bleed passage which provides damping at low fluid speeds, as described herein.

Figure 4A:
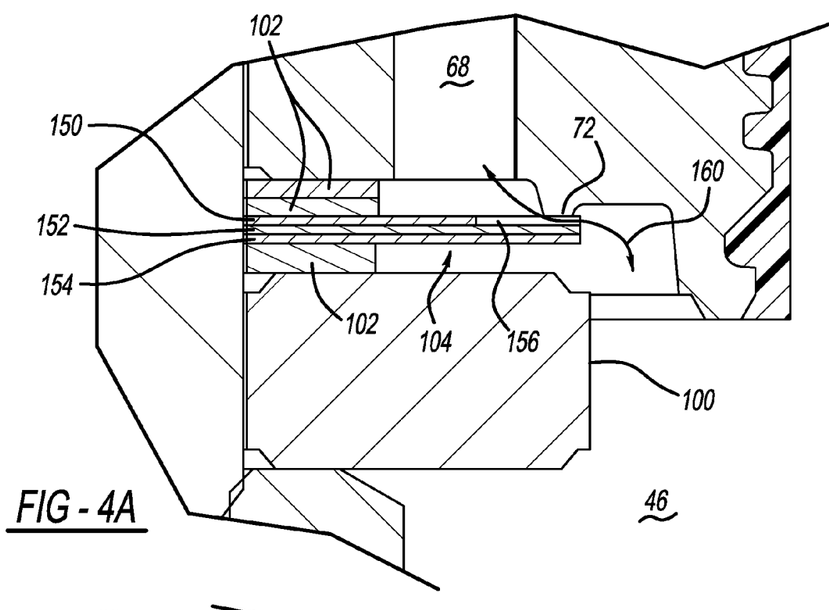
FIGS. 4A and 4B are enlarged views of a rebound valve disc assembly and a compression valve disc assembly, respectively.
Figure 4B:
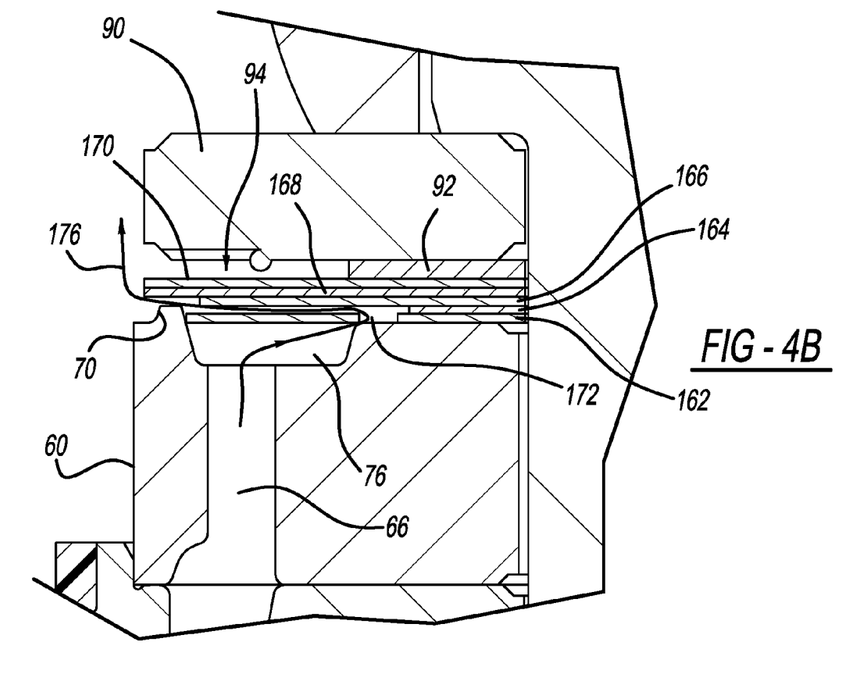

Referring now to FIGS. 4A and 4B, the rebound valve disc assembly 104 and the compression valve disc assembly 94 include a plurality of discs that control the flow of fluid through the piston body 60. As shown in FIG. 4A, the rebound valve disc assembly 104 includes an orifice disc 150 and one or more spring discs 152 and 154. The orifice disc 150 defines one or more orifices 156, and may also be referred to as a bleed disc. The spring discs 152 and 154 are positioned next to the orifice disc 150. More particularly, the order of the discs from the rebound valve land 72 toward the retainer 100 is provided as the orifice disc 150, the spring discs 152 and 154.

The orifice disc 150, and the spring discs 152 and 154 are positioned at the rebound valve land 72 of the piston body 60. The orifice disc 150 abuts with the rebound valve land 72 and forms a bleed passage referenced by arrow 160 for allowing fluid to flow between the upper working chamber 44 and the lower working chamber 46 at low piston speeds. The bleed passage 160 is open during compression and rebound, thereby allowing fluid to flow from the upper working chamber 44 to the lower working chamber 46 and vice versa.

Figure 5:
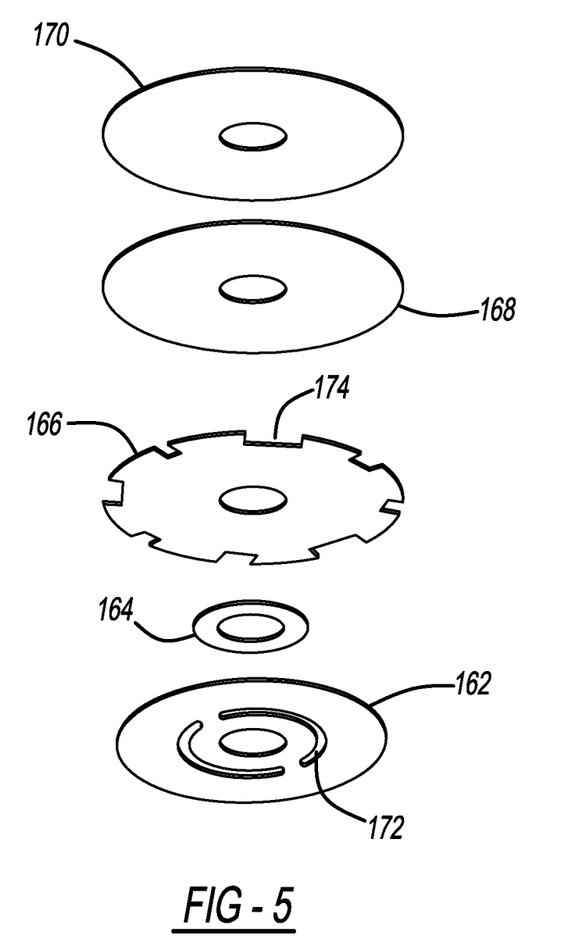
FIG. 5 is an exploded view of the compression valve disc assembly.

With reference to FIGS. 4B and 5, the compression valve disc assembly 94 includes a check disc 162, an intermediate disc 164, an orifice disc 166, and one or more spring discs 168 and 170. The check disc 162 is positioned within the compression valve land 70 and is positioned against the piston body 60. The orifice disc 166 is positioned at the compression valve land 70 with the intermediate disc 164 positioned between the orifice disc 166 and the check disc 162. The spring discs 168 and 170 are positioned on the side of the orifice disc 166 opposite of the intermediate disc 164.

The check disc 162 defines one or more channels 172 for allowing fluid flow during low piston speed, as described below. The channels 172 are configured to abut against the surface of the piston body 60, and do not overlap with the passages 66 and 68 defined by the piston body 60. The number, size, and shape of the channel may be configured based on, for example, the piston, other discs of the valve disc assembly, and/or a desired damping characteristic. Therefore, the channel is not limited to the shape illustrated.

The intermediate disc 164 has a smaller diameter than the check disc 162 and the orifice disc 166. The diameter of the intermediate disc 164 is configured to not overlap with or block the channel 172. The intermediate disc 164 defines a clearance between the check disc 162 and the orifice disc 166 to provide room for the check disc 162 to flex during compression. The intermediate disc 164 may also set a preload on the rest of the valve disc assembly 94.

The orifice disc 166 abuts against the compression valve land 70 and defines one or more orifices 174. The orifice disc 166 forms a bleed passage referenced by arrow 176 (FIG. 4B) with the channel 172 of the check disc 162. The bleed passage 176 and the bleed passage 160 control the damping characteristics of the shock absorber during low fluid speeds by permitting a limited amount of fluid to flow between the upper working chamber 44 and the lower working chamber 46. Unlike the bleed passage 160, which is open during compression and rebound, the bleed passage 176 is open during compression but is closed during rebound.

More particularly, the check disc 162 controls the flow of fluid between the upper working chamber 44 and the lower working chamber 46 via the bleed passage 176 during low piston speed. During compression at low piston speed, fluid from the lower working chamber 46 flows through the compression passages 66. The check disc 162 flexes to allow fluid to flow through the channel 172 and out through the orifice 174 of the orifice disc 166 to the upper working chamber 44. During rebound at low piston speeds, fluid from the upper working chamber 44 flows toward the compression passages 66. The pressure from the fluid pushes the check disc 162 against the piston body 60 such that the channels 172 are sealed against the piston body 60. Accordingly, fluid is prohibited from flowing through the bleed passage 176 and into the compression passages 66 during low piston speed.

The check disc 162 of the present disclosure controls the bleed passage 176 formed by the orifice 174 of orifice disc 166 and the channel 172 of the check disc 162 such that, during rebound, the bleed passage 176 is closed and, during compression, the bleed passage 176 is open. Accordingly, the bleed passage 160 and the bleed passage 176 provide damping during compression at low fluid speeds and, during rebound, the bleed passage 160 provides damping at low fluid speeds. By having the check disc 162, the shock absorbers 20, 26 provide soft damping characteristics for low speed compression and hard damping characteristics for low speed rebound. Thus, the damping characteristics of shock absorbers 20, 26 may be tuned independently for rebound and compression for low fluid speeds. In the example embodiments, the check disc 162 is disposed with the compression valve disc assembly 94. It is readily understood that the check disc 162 may be disposed in the rebound valve disc assembly 104 for controlling the bleed passage on the rebound side, such that the bleed passage would allow fluid flow during rebound and prevent fluid flow during compression.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shock absorber for a vehicle comprising:
a pressure tube defining a fluid chamber;
a piston disposed within the fluid chamber, the piston dividing the fluid chamber into an upper working chamber and a lower working chamber, wherein the piston defines a compression passage and a rebound passage that extend through the piston between the upper working chamber and the lower working chamber; and
a valve disc assembly engaging the piston and controlling a flow of fluid between the upper working chamber and the lower working chamber, the valve disc assembly including a check disc positioned within a land of the piston and an orifice disc positioned at the land of the piston, wherein
the orifice disc defines an orifice, and
the check disc defines one or more channels and is positioned between the piston and the orifice disc, the check disc controls the flow of fluid through the orifice by deflecting from a seated position on the piston to an unseated position to allow fluid to flow through the orifice in a first direction and prohibit fluid to flow through the orifice in a second direction opposite to the first direction when the check disc is at the seated position, the shock absorber further comprising an intermediate disc positioned between the orifice disc and the check disc, wherein an outer diameter of the intermediate disc is less than an outer diameter of the orifice disc and an outer diameter of the check disc.

2. The shock absorber of claim 1 wherein the channels are defined along a portion of the check disc that is adjacent to a surface of the piston and away from the compression passage and the rebound passage.

3. The shock absorber of claim 1,
wherein the check disc defines one or more channels positioned outside of a portion of the check disc that overlaps with the intermediate disc.

4. The shock absorber of claim 1 wherein the valve disc assembly controls the flow of fluid on a compression side of the piston.

5. A shock absorber for a vehicle comprising:
a pressure tube defining a fluid chamber;
a piston disposed within the fluid chamber and having a support land circumferentially extending along a surface of the piston, wherein the piston divides the fluid chamber into an upper working chamber and a lower working chamber, and the piston defines a compression passage and a rebound passage that extend through the piston between the upper working chamber and the lower working chamber; and
a valve disc assembly engaging the piston and controlling a flow of fluid between the upper working chamber and the lower working chamber, the valve disc assembly including a check disc, an intermediate disc, and an orifice disc, wherein:
the check disc is positioned within the support land of the piston and defines a channel,
the intermediate disc is positioned between the check disc and the orifice disc, an outer diameter of the intermediate disc is less than an outer diameter of the orifice disc and an outer diameter of the check disc,
the orifice disc defines an orifice, the orifice and the channel of the check disc form a portion of a bleed passage between the upper working chamber and the lower working chamber, and
the check disc closes the bleed passage as the fluid flows in a first direction and opens the bleed passage as the fluid flows in a second direction opposite of the first direction.

6. The shock absorber of claim 5 wherein, in the first direction, fluid flows from the upper working chamber toward the lower working chamber and, in the second direction, fluid flows from the lower working chamber toward the upper working chamber.

7. The shock absorber of claim 5 wherein the valve disc assembly controls the flow of fluid through the compression passage.

8. The shock absorber of claim 5 wherein the orifice disc is positioned at the support land.

9. The shock absorber of claim 5 wherein the check disc presses against a surface of the piston when fluid flows in the first direction and moves away from the piston when fluid flows in the second direction.

10. The shock absorber of claim 5 wherein the channel of the check disc is provided at a position of the check disc that overlaps with a surface of the piston away from the compression passage and that is outside of the outer diameter of the intermediate disc.

11. The shock absorber of claim 5 wherein the intermediate disc defines a clearance between the check disc and the orifice disc.

12. A shock absorber for a vehicle comprising:
a pressure tube defining a fluid chamber;
a piston disposed within the fluid chamber, the piston dividing the fluid chamber into an upper working chamber and a lower working chamber, wherein the piston defines a compression passage and a rebound passage that extend through the piston between the upper working chamber and the lower working chamber;
a rebound valve assembly engaging the piston and controlling fluid flow through the rebound passage; and
a compression valve assembly engaging the piston, the compression valve assembly controls a flow of fluid through the compression passage, wherein the compression valve assembly includes a check disc and an orifice disc with a clearance defined between the check disc and the orifice disc, the orifice disc defines an orifice, the check disc is positioned between the piston and the orifice disc, and the check disc controls the flow of fluid through the orifice, wherein the check disc prevents the flow of fluid through the orifice during a rebound stroke and permits the flow of fluid through the orifice during a compression stroke.

13. The shock absorber of claim 12 wherein:
the piston includes a support land extending circumferentially along a surface of the piston,
the check disc is positioned within the support land, and
the orifice disc is positioned at the support land.

14. The shock absorber of claim 12 wherein the check disc defines one or more channels along a portion of the check disc that is adjacent to a surface of the piston and away from the compression passage and the rebound passage.

15. The shock absorber of claim 12 further comprising:
an intermediate disc positioned between the orifice disc and the check disc and defining the clearance between the orifice disc and the check disc, wherein an outer diameter of the intermediate disc is less than an outer diameter of the orifice disc and an outer diameter of the check disc.

16. The shock absorber of claim 12 further comprising:
an intermediate disc positioned between the orifice disc and the check disc, wherein an outer diameter of the intermediate disc is less than an outer diameter of the orifice disc and an outer diameter of the check disc, and further wherein,
the check disc defines one or more channels at a position of the check disc that overlaps with a surface of the piston away from the compression passage and is outside of the outer diameter of the intermediate disc.

* * * * *